(12) United States Patent
Ernst et al.

(10) Patent No.: US 8,752,394 B2
(45) Date of Patent: Jun. 17, 2014

(54) DETERMINING FAN PARAMETERS THROUGH PRESSURE MONITORING

(75) Inventors: James Ernst, Carmel, IN (US); Claudio Zizzo, Derby (GB); Shawn Thomas Collins, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 764 days.

(21) Appl. No.: 12/723,835

(22) Filed: Mar. 15, 2010

(65) Prior Publication Data
US 2011/0219741 A1 Sep. 15, 2011

(51) Int. Cl.
*F02C 9/00* (2006.01)

(52) U.S. Cl.
USPC .......................................................... 60/793

(58) Field of Classification Search
USPC .................. 60/793, 226.1, 262, 269, 773, 39, 60/39.15; 73/170.02
See application file for complete search history.

(56) References Cited

U.S. PATENT DOCUMENTS

| | | | |
|---|---|---|---|
| 5,617,315 | A | 4/1997 | Nakao et al. |
| 5,686,669 | A | 11/1997 | Hernandez et al. |
| 5,744,723 | A | 4/1998 | Piety |
| 5,784,300 | A | 7/1998 | Neumeier et al. |
| 5,789,678 | A | 8/1998 | Pla |
| 6,445,995 | B1 | 9/2002 | Mollmann |
| 6,494,046 | B1 | 12/2002 | Hayess |
| 6,552,291 | B1 | 4/2003 | Kobayashi et al. |
| 6,768,607 | B2 | 7/2004 | Ottesen et al. |
| 6,823,253 | B2 | 11/2004 | Brunell |
| 6,918,747 | B2 | 7/2005 | Comperat et al. |
| 7,011,498 | B2 * | 3/2006 | Vos et al. .................. 416/28 |
| 7,027,909 | B2 | 4/2006 | deBotton et al. |

(Continued)

FOREIGN PATENT DOCUMENTS

GB 2387522 10/2003

OTHER PUBLICATIONS

Mueller, Study of Stator Vane Fluctuating Pressures in a Turbofan Engine for Static and Flight Tests, Apr. 1984, NASA pp. 5-6, 24-28 http://ntrs.nasa.gov/archive/nasa/casi.ntrs.nasa.gov/19840014295_1984014295.pdf Jan. 26, 2013 4:32pm.*
Mair, Aircraft Performance, 1992, Cambridge University Press, p. 101.*
International Search Report, PCT/US2011/028507, Nov. 25, 2011, 2 pages.
Written Opinion of the International Searching Authority, PCT/US2011/028507, Nov. 25, 2011, 8 pages.

*Primary Examiner* — Phuttiwat Wongwian
*Assistant Examiner* — William Breazeal
(74) *Attorney, Agent, or Firm* — Krieg DeVault LLP (57) ABSTRACT

A method for determining the speed of at least one rotating fan, such as a propeller, through sensing pressure waves generated by the blades of the fan. An apparatus operable to execute the method is also disclosed. The apparatus includes a fan having a hub portion and a plurality of blades extending radially outward from the hub portion. The apparatus also includes an engine operable to rotate the fan about an axis of rotation. The apparatus also includes a sensor spaced from the fan along the axis of rotation. The sensor is positioned to sense at least one physical condition that is external of the engine and is changed by rotation of the plurality of blades. The sensor is operable to emit a signal corresponding to at least one physical condition. The apparatus also includes a processor operably engaged with the engine and the sensor. The processor is operable to receive the signal from the sensor and change the operation of the engine in response to the signal to change a speed of the fan.

24 Claims, 4 Drawing Sheets

(56) References Cited

U.S. PATENT DOCUMENTS

| | | |
|---|---|---|
| 7,086,834 B2 * | 8/2006 | LeMieux .......................... 416/1 |
| 7,234,305 B2 | 6/2007 | Nomura et al. |
| 7,305,094 B2 | 12/2007 | Kashani |
| 7,341,257 B2 | 3/2008 | Toth et al. |
| 7,406,820 B2 | 8/2008 | Critchley et al. |
| 7,445,431 B2 * | 11/2008 | Larsen et al. ..................... 416/1 |
| 7,603,844 B2 | 10/2009 | Moniz et al. |
| 8,316,716 B2 * | 11/2012 | Kuhlmeier ....................... 73/660 |
| 2003/0219132 A1 * | 11/2003 | Sommerfeldt et al. .... 381/71.14 |
| 2006/0119348 A1 * | 6/2006 | Blossfeld ...................... 324/166 |
| 2009/0263247 A1 | 10/2009 | Mollmann |

* cited by examiner

DETERMINING FAN PARAMETERS THROUGH PRESSURE MONITORING

BACKGROUND OF THE INVENTION

1. Field of the Invention

The invention relates to monitoring the parameters of a fan, such as the speed of rotation.

2. Description of Related Prior Art

U.S. Pat. No. 6,918,747 discloses a method and system for detecting damage to the rotor of an aircraft engine using devices for measuring vibration and speed in order to acquire data relating to the speed of the rotor and also to the amplitude and the phase of rotor vibration during a determined flight. The method includes the following steps: reading the acquired data; calculating a mean vibration vector over a determined rotor speed range on the basis of the acquired data; calculating a vector difference between the mean vibration vector of the determined flight and the mean vibration vector of a reference flight for the rotor speed range; comparing the modulus of the vector difference with a predetermined threshold value; and issuing a warning signal when the modulus of the vector difference exceeds the predetermined threshold value, the steps being performed after the determined flight has been completed.

SUMMARY OF THE INVENTION

In summary, the current invention is a method for determining the speed of at least one rotating fan, such as a propeller, through sensing pressure waves generated by the blades of the fan. The current invention is also an apparatus operable to execute the method. The apparatus includes a fan having a hub portion and a plurality of blades extending radially outward from the hub portion. The apparatus also includes an engine operable to rotate the fan about an axis of rotation. The apparatus also includes a sensor spaced from the fan along the axis of rotation. The sensor is positioned to sense at least one physical condition that is external of the engine and is changed by rotation of the plurality of blades. The sensor is operable to emit a signal corresponding to at least one physical condition. The apparatus also includes a processor operably engaged with the engine and the sensor. The processor is operable to receive the signal from the sensor change the operation of the engine in response to the signal to change a speed of the fan.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

The invention, as exemplified in the embodiment described below, can be applied to determine the parameters of a fan. The parameters of a fan can include speed of rotation, blade pitch, vibration of the fan, or imbalance in the fan. A propeller is an example of a fan. In some open rotor configurations of turbine engines, direct physical measurement of propeller speed is challenging. In an open rotor configuration, two adjacent propellers are disposed to rotate in opposite directions relative to one another. Measurement of the rotor or drive shaft causing rotation of the propellers may not be appropriate if there is no direct correlation between the rotational speed of the drive shaft and the rotational speed of the propellers. Also, the two propellers do not have a correlated speed since they turn in opposite directions. The exemplary embodiment can be applied to indirectly assess propeller speed as well as other parameters.

Figure 1:
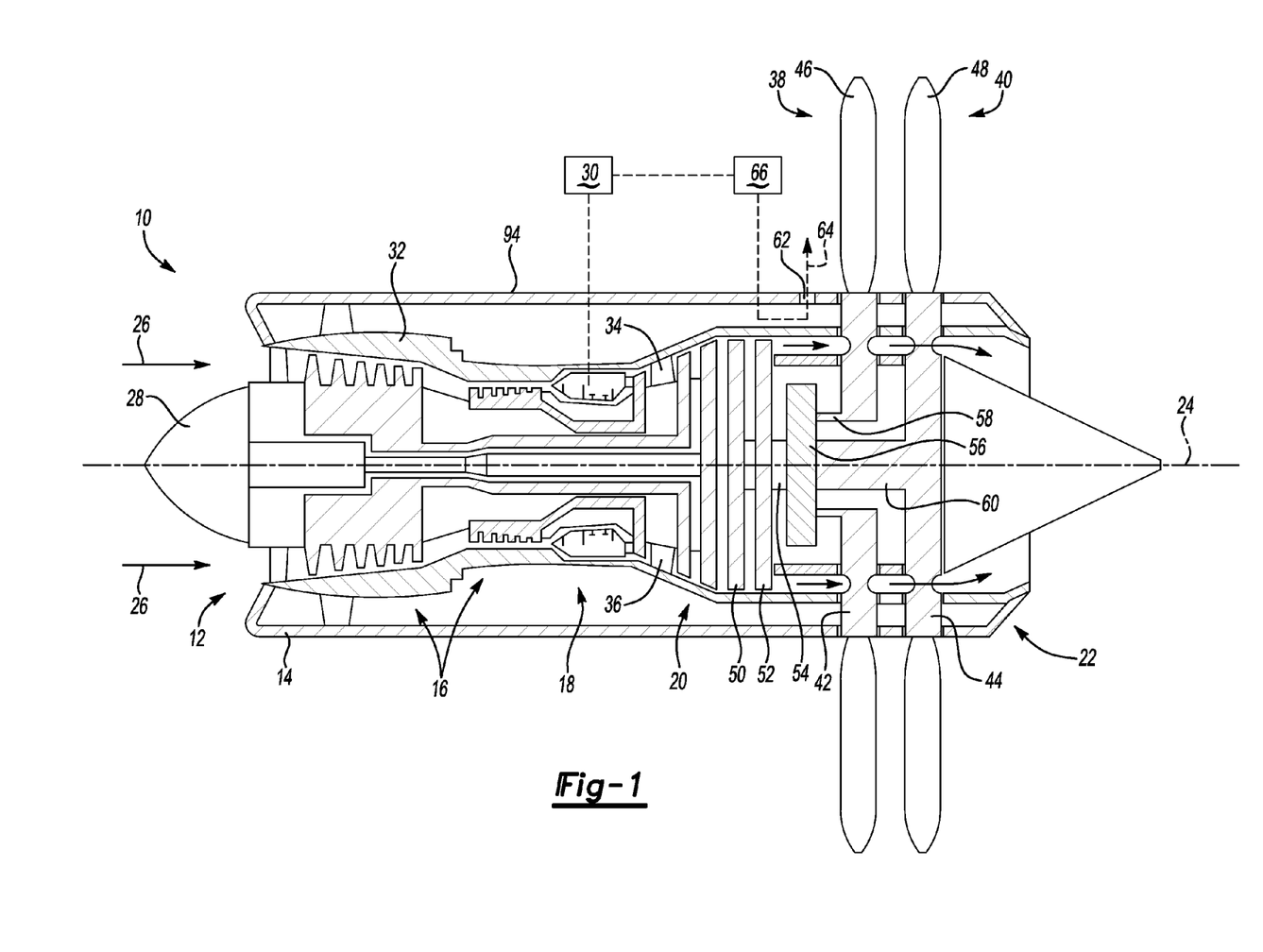
FIG. 1 is a schematic representation of a turbine engine incorporating an exemplary embodiment of the invention.

FIG. 1 is a schematic representation of a turbine engine incorporating a first exemplary embodiment of the invention. A turbine engine 10 can include an inlet 12 be housed in a nacelle 14. The turbine engine 10 can also include a compressor section 16, a combustor section 18, and a turbine section 20. The turbine engine 10 can also include an exhaust section 22. The compressor section 16, combustor section 18, turbine section 20, and exhaust section 22 can be arranged along a centerline axis 24. Components of the compressor section 16 and the turbine section 20 can rotate about the centerline axis 24. Fluid such as air can be drawn into the turbine engine 10 as indicated by the arrows referenced at 26. The fluid enters the compressor section 16 from the inlet 12 and is compressed. A nose cone 28 can be proximate to the inlet 12 to gently direct air into the compressor section 16. The schematically shown compressor section 16 includes high and low pressure compressor sections. In some embodiments, a portion of the fluid can be diverted radially outside of the compressor section 16 and thereby become bypass flow. The compressed fluid emerging from the compressor section 16 is mixed with fuel from a fuel system 30 and ignited in the combustor section 18. Combustion gases exit the combustor section 18 and flow through the turbine section 20. Energy is extracted from the combustion gases in the turbine section 20.

A turbine case 32 can encircle the core engine components (the compressor, combustor and turbine sections 16, 18, 20). The case 32 can support non-rotating structures such as compressor vanes (not shown) and turbine vanes. Exemplary turbine vanes are referenced at 34 and 36 and can be positioned to direct the flow of combustion gases to the turbine section 20. The combustion gases passing aft of the turbine section are referenced by unnumbered arrows. These gases can be applied to generate thrust for an aircraft.

In the open rotor configuration shown in FIG. 1, power can be drawn from the core engine components to rotate propellers 38, 40. Each of the propellers respectively includes a hub portion 42, 44 and a plurality of blades, such as blades 46, 48. In the exemplary embodiment, one or more free power turbines, such as turbines 50, 52 can drive a shaft 54. Combustion gases pass over and thereby cause rotation of the free power turbines 50, 52.

The shaft 54 can extend into a gear box 56. Respective drive shafts 58, 60 can extend from the gear box 56. The drive shaft 58 is fixed for rotation with the hub portion 42 of the propeller 38. The drive shaft 60 is fixed for rotation with the hub portion 44 of the propeller 40. In operation, the gears (not shown) of the gear box 54 can transmit the power input by the shaft 54 into counter-rotation of the propellers 38 and 40. The schematic illustration of FIG. 1 is a "pusher" open rotor configuration and it is noted that embodiments of the invention can be practiced with "tractor" open rotor configuration wherein the propellers are forward/upstream of the compressor section.

FIG. 1 also shows a sensor 62 spaced from the propellers 38, 40 along the axis 24 of rotation. The sensor 62 is positioned to sense at least one physical condition that is external of the turbine engine 10 and is changed by rotation of the plurality of blades 46 and/or 48. In the exemplary embodiment of the invention the sensor 62 can sense at least one physical condition changed by rotation of both of the plurality of blades of the propellers 38 and 40. In alternative embodiments of the invention, such as embodiments in which one fan is applied, a sensor can be positioned to sense at least one physical condition changed by rotation of the single fan. In addition, other embodiments of the invention can be practiced wherein a sensor can be positioned to sense at least one physical condition that is changed by rotation of a single fan of two adjacent fans.

The sensor 62 can be positioned upstream or downstream of the propellers 38, 40. The sensor 62 can be flush with the nacelle 14 such that part of the sensor 62 that is substantially synchronous with the outer surface 94 of the nacelle 14. The portion of the sensor 62 that is aligned with the outer surface of the nacelle 14 does not substantially disrupt laminar flow over the nacelle 14.

The sensor 62 will sense the physical condition in a field of view. The field of view of the sensor 62 can be centered along an axis that does not intersect the blades. For example, the exemplary sensor 62 can have a field of view centered on an axis 64 extending perpendicular to the axis 24. Alternatively, the sensor 62 can be positioned such that the field of view is centered on an axis that is oblique or parallel to the axis 24.

A sensor is a device that measures a physical quantity and converts it into a signal which can be read by an observer or by an instrument such as processor. The exemplary sensor 62 can be operable to sense a level of ambient pressure. In alternative embodiments, a sensor can be operable to sense a level of sound.

The rotation of the propellers 38, 40 can cause changes in the ambient pressure and can also generate sound waves. Sound waves are pressure oscillations. The sound pressure is the difference between the pressure wave of sound and the average ambient pressure of the medium outside of the sound wave in which the sound wave is traveling. Embodiments of the invention can be practiced in which ambient pressure is sensed and/or in which the sound pressure is sensed.

The sensor 62 can be a pressure sensor 62, operable to sense the level of ambient pressure. A pressure sensor 62 can generate a signal as a function of the pressure imposed on the sensor's field of view. The signal can be electrical. Pressure sensors can alternatively be called pressure transducers, pressure transmitters, pressure senders, pressure indicators, piezometers, and manometers, for example. In terms of pressure type, pressure sensors can be an absolute pressure sensor, a gauge pressure sensor, a vacuum pressure sensor, a differential pressure sensor, a sealed pressure sensor, for example. Pressure sensors can sense pressure through force collection, such as with a piezoresistive strain gage, capacitive methods, electromagnetic methods, piezoelectric structures, optical fibers, potentiometric technology. It is noted that any kind of pressure sensor can be applied in embodiments of the invention. A pressure sensor applied in an embodiment of the invention can be selected in view of the operating conditions associated with the embodiment.

Sound pressure is the local pressure deviation from the ambient (average or equilibrium) pressure caused by a sound wave. A sensor for detecting sound is, in general, called a microphone. The microphone can be classified into several basic types including dynamic, electrostatic, and piezoelectric, for example. Conventional microphones can measure sound pressure, which represents sound intensity at a specific place. Sound intensity is a measure of the flow of energy passing through a unit area per unit time. A sound intensity microphone probe can capture sound intensity together with the unit direction of flow as a vector quantity. It is noted that any kind of sound sensor can be applied in embodiments of the invention. A sound sensor applied in an embodiment of the invention can be selected in view of the operating conditions associated with the embodiment.

It is also noted that embodiments of the invention can be practiced with a sensor operable to sense vibration. The variation in pressure around a propeller, whether in terms of ambient pressure or because of sound waves, could be sensed by allowing a mass to vibrate in the field of pressure changes.

Figure 2:
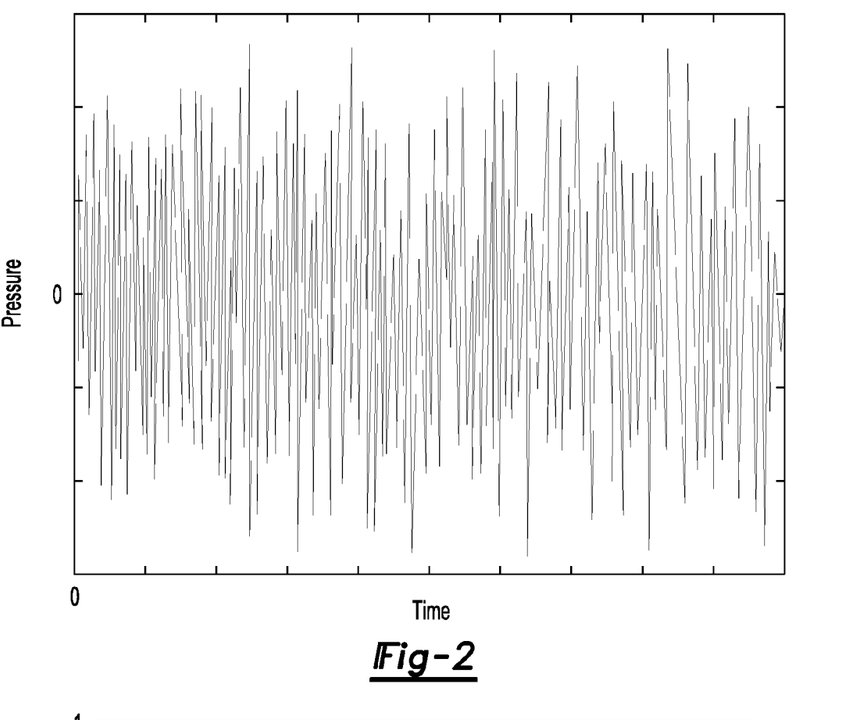
FIG. 2 is a graph showing data acquired by a sensor in the time domain (real time)

The exemplary sensor 62 is operable to emit a signal corresponding to the ambient pressure. The signal can be a continuous and analyzed in real time. FIG. 2 is an exemplary graph showing data emitted by the sensor 62 in the time domain. The x-axis of the graph corresponds to time and the y-axis of the graph corresponds to the magnitude of pressure. It is noted that the graph of FIG. 2 reflects changes in ambient pressure caused by the closest propeller 38 as well as the furthest propeller 40. The sensor 62 is thus positioned to concurrently sense at least one physical condition external of the engine changed by rotation of the plurality of blades of the first propeller 38 and changed by rotation of the plurality of blades of the second propeller 40.

Referring again to FIG. 1, a processor 66 is operably engaged with the turbine engine 10 and the sensor 62. The processor 66 is operable to receive the signal from the sensor 62 and change the operation of the turbine engine 10 in response to the signal. For example, the processor 66 can control the fuel system 30 to direct more or less fuel to the combustor section 18 in response to the signal received from the sensor 62. More or less fuel can be directed to increase or decrease, respectively, the speed of the propellers.

In the operation of the exemplary embodiment, the sensor 62 can sense the pressure dynamically (continuously over time). The sensed variation in pressure over time can be represented as a graph in the time domain, such as shown in FIG. 2. The processor 66 can be operable to convert the pressure data sensed in the time domain to the frequency domain with a fast Fourier transform. A fast Fourier transform (FFT) is an algorithm to compute the discrete Fourier transform (DFT) and its inverse. A DFT decomposes a sequence of values into components of different frequencies. An FFT is a way to compute the same result as a DFT, but more quickly. In the exemplary embodiment of the invention, an FFT can be programmed into the processor 66. There are many distinct FFT algorithms, such as the Cooley-Tukey algorithm, the Prime-factor FFT algorithm, Bruun's FFT algorithm, Rader's FFT algorithm, and Bluestein's FFT algorithm. Embodiments of the invention can apply any FFT algorithm.

Figure 3:
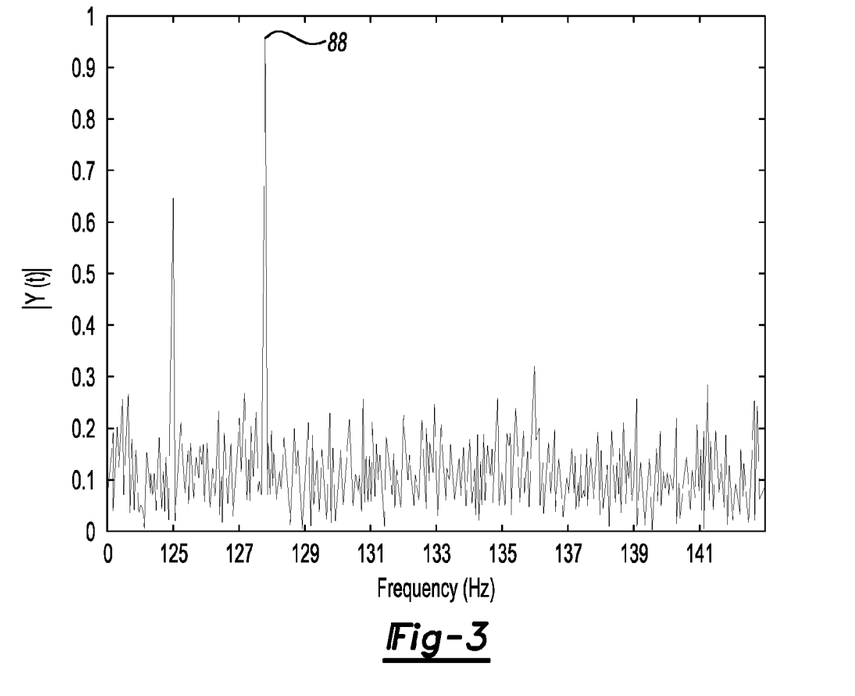
FIG. 3 is a graph showing data converted from the time domain into the frequency domain.

FIG. 3 shows the resulting graph when the signal corresponding to the sensed variation in ambient pressure is converted from the time domain (FIG. 2) to the frequency domain with an FFT. The x-axis of the graph of FIG. 3 corresponds to frequency and the y-axis of the graph corresponds to magnitude, a non-dimensional and absolute value being less than one. The exemplary graph of the frequency domain reveals two dominant frequencies, substantially 125 Hz and 128 Hz. These two dominant frequencies have the highest magnitude in the frequency domain and can be associated the angular velocities of the respective propellers 38, 40 (shown in FIG. 1). The other frequencies can be dismissed as noise.

The higher magnitude frequency (in the exemplary embodiment, 128 Hz) can be associated with the propeller 38 nearest to the sensor 62 since the magnitude of ambient pressure changes caused by the nearest propeller 38 will be greater than the magnitude of ambient pressure changes caused by the furthest propeller 38. As set forth above the magnitude is defined along the y-axis and not along the axis. In the exemplary embodiment, a point referenced at 88 corresponds to the highest magnitude of any frequency identified along the x-axis.

The rotational speeds (angular velocities) of the respective propellers 38, 40 can be determined by dividing each respective frequency by the number of blades of the respective propeller 38, 40. In the exemplary embodiment, if the propeller 38 has five blades, the speed of rotation of the propeller 38 would be around 25.6 revolutions per second. It is noted that the values provided in the graphs of FIGS. 2 and 3 are exemplary and not applicable to every embodiment of the invention.

Figure 4:
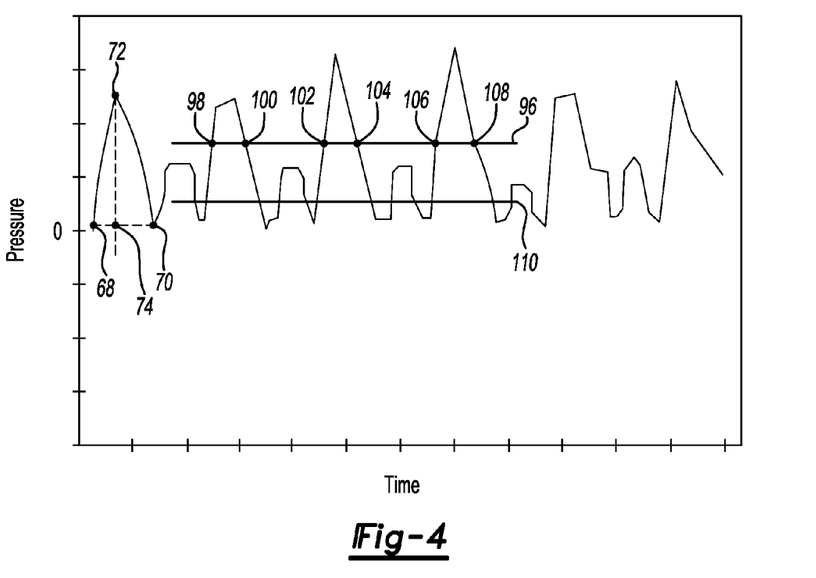
FIG. 4 is a second graph of data in the time domain.

FIG. 4 is a second graph of data in the time domain that can be associated with the exemplary turbine engine shown in FIG. 1. Whereas the graph in FIG. 2 shows the effect of noise in the display of pressure data, the graph in FIG. 4 can be acquired by filtering substantially all noise from the signal received from the sensor 62 (shown in FIG. 1). Filtering is not absolutely necessary but can be desirable to simplify processing.

In FIG. 4, the cumulative wave form includes a series of relatively high amplitude peaks in alternating relationship with a series of relatively low amplitude peaks. Each of the series of relatively high amplitude peaks corresponds to a blade from the nearest propeller passing by the sensor. Each of the series of relatively low amplitude peaks corresponds to a blade from the furthest propeller passing by the sensor. It is noted that FIG. 4 reflects two propellers rotating at the same speed and 180° out of phase from one another. Thus, FIG. 4 does not correspond to FIG. 3 wherein the propellers are rotating at different speeds. Embodiments of the invention can be practiced wherein two propellers are not rotating at the same speed and/or are out of phase from one another some angle different from 180°.

Generally, the wave form in the time domain includes an individual peaks characterized by a "rise+decay" time (RD time) and an amplitude. With reference to the graph of FIG. 4, the RD time of the first individual peak extends between the points referenced at 68 and 70. The amplitude of the first individual peak corresponds to the maximum pressure reached during this portion of the wave and is referenced at point 72. It is noted that the rise portion of the RD time, extending between the point 68 and a point referenced at point 74, can be shorter than the decay portion of the RD time. The decay portion of the first peak extends between the points 74 and 72. The line passing through points 68, 74, and 70 can be perfectly parallel to the x-axis or substantially parallel.

Figure 5A:
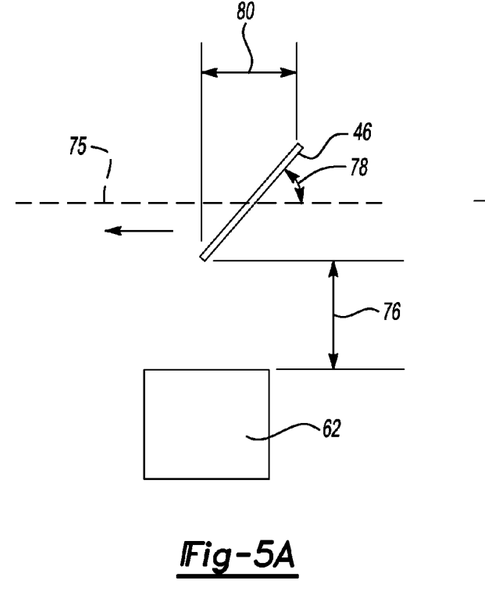
FIGS. 5A and 5B are schematic representations of a blade passing by a sensor.

The data acquired in the time domain can be processed to ascertain a pitch of the blades of the propellers. In FIG. 5A, the blade 46 is travelling past the sensor 62 along an axis 75. The axis 75 corresponds to the path of rotational movement for the blade 46. A distance between the sensor 62 and the portion of the blade 46 nearest the sensor 62 is referenced at 76. The pitch of the blade 46 corresponds to an angle referenced at 78. The blade defines a width in the field of view of the sensor 62 referenced at 80.

Figure 5B:
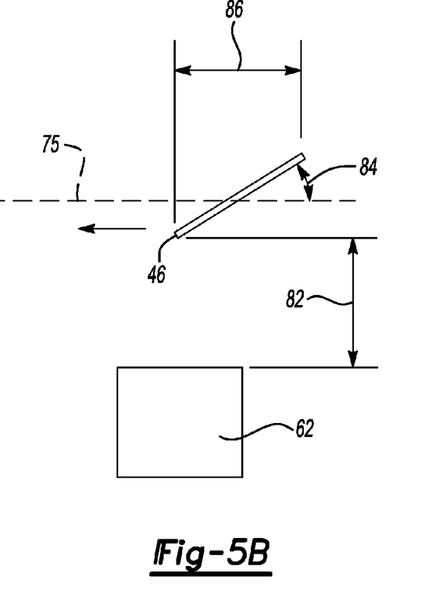

In FIG. 5B, the blade 46 is travelling past the sensor 62 along the axis 75, but at a pitch different from the pitch shown in FIG. 5A. The axis 75 corresponds to the path of rotational movement for the blade 46. The distance between the sensor 62 and the portion of the blade 46 nearest the sensor 62 is referenced at 82. The distance 82 is greater than the distance 76. The pitch of the blade 46 corresponds to an angle referenced at 84. The angle 84 is less than the angle 78. The blade defines a width in the field of view of the sensor 62 referenced at 86. The width 86 is greater than the angle 80.

The amplitude and/or the RD time in the time domain can be assessed to ascertain the pitch of the blades. For example, the amplitude of the wave form corresponding to FIG. 5A will be greater than the wave form corresponding to FIG. 5B. This will occur because the distance 76 is less than the distance 82. The ambient pressure proximate the sensor 62 will be relatively greater when a blade passes relatively close to the sensor.

The RD time also corresponds to blade pitch. For example, the RD time of the wave form corresponding to FIG. 5B will be greater than the wave form corresponding to FIG. 5A. This will occur because the width 86 is greater than the width 80. The ambient pressure proximate the sensor 62 will rise and fall over a relatively longer period of time when a relatively "wider" blade passes the sensor. Thus, the arrangement in FIG. 5A would generate a wave form having taller and narrower individual peaks and the arrangement in FIG. 5B would generate a wave form having shorter and wider individual peaks.

It is noted that the pitch of the blades may or may not be ascertained precisely based on the particular form of the wave. For example, the turbine engine may in a sense be calibrated such that a particular RD time or amplitude that sensed can be correlated to a particular blade pitch. A number of predetermined wave forms can be stored in the memory of the processor, each corresponding to a particular blade pitch. An RD time that is sensed during operation can be compared to the predetermined wave forms stored in the memory of the processor to identify a current blade pitch.

Alternatively, the wave form may be assessed for blade pitch in a more relative sensed. For example, the operating conditions of the turbine engine may tend to indicate that changing the pitch of the blades is desirable. The processor can store the attributes of a first wave form prior to the pitch of the blades being changed and then compare a subsequent wave form in the time domain with the first wave form to confirm that the pitch of the blades has changed. It is noted that the processor 66 shown in FIG. 1 can be operable to control systems for changing blade pitch, such as shown in U.S. Pat. Nos. 5,478,203 and 5,090,869 which are hereby incorporated by reference for such teaching.

Figures 6A, 6B:
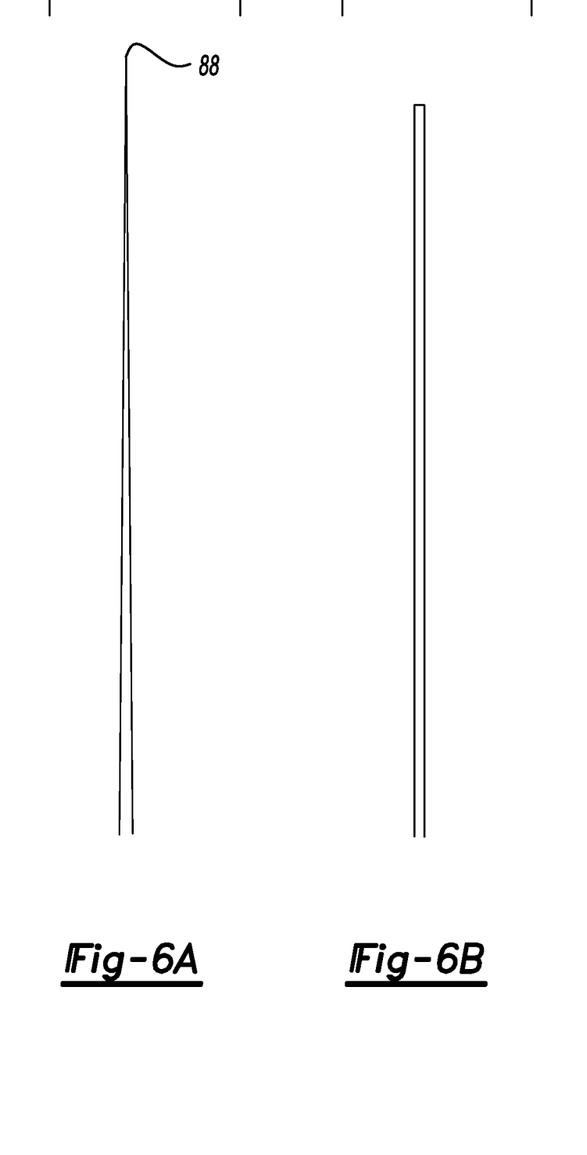
FIGS. 6A-6C are portions of graphs in the frequency domain.

The wave form in the time domain can be applied to ascertain the pitch of the blades and the wave form in the frequency domain can be applied to identify other parameters of the propellers. For example, the processor can determine that one or more of the blades of a propeller is vibrating. In FIG. 3, the point 88 is a relatively sharp point defined at the dominant peak of the graph. This portion of the graph is magnified in FIG. 6A. A vibrating blade in the frequency domain would generally appear as a flat top on the dominant peak rather than a sharp point. This is shown in FIG. 6B. Each point of the generally flat top would represent a different, but numerically close frequency. Thus, vibration can be identified if the processor detects a sequential series of frequencies having substantially the same magnitude in the frequency domain. It is noted that FIGS. 6B and 6C have lower height than 6A since the energy associated the pressure waves is spread across a wider (although still narrow) frequency band.

In some operating environments, the computational resources on an engine control unit can be limited or scarce and FFT (frequency) calculations can be numerically demanding. In such operating environments, embodiments of the invention can be practiced that are less computationally intensive. Despite being less computationally intensive, such embodiments can be applied to monitor the health of the turbine engine but also to execute control commands. These embodiments may not be as accurate as the FFT analysis, but can be sufficiently accurate and can also be implemented with existing electronic engine controller (EEC) hardware.

For example, there is significant data to collect and analyze in the time domain. Velocity can be assessed with a variable threshold comparator plus pulse shaping and counting. In FIG. 4, a first comparator threshold associated with the exemplary embodiment is referenced at line 96. Respective pulses of pressure associated with the exemplary embodiment last between points referenced at 98 and 100, 102 and 104, as well as 106 and 108. The beginning and ending of a pulse is defined when the curve intersects the first comparator threshold 96. Counting the number of pulses over time (the horizontal axis of the exemplary graph) corresponds to the frequency and therefore the velocity of the blades nearer to the sensor (such as the sensor 62 shown in FIGS. 1, 5A and 5B). The position of the first comparator threshold can be adjustable such that only pulses from the blades nearer to the sensor are captured. A second comparator threshold associated with the exemplary embodiment is referenced at line 110. The second (or lower) comparator threshold 110 will capture the pulses of both the nearer and further propeller rows. The count of pulses based on the second comparator threshold 110 will be greater than the count of pulses based on the first comparator threshold 96. The difference of the two counts corresponds to the frequency of the lower amplitude train (the series of lower amplitude pulses over time) and therefore the velocity of the blades further away from the sensor. Both the first and second comparator thresholds can be adjustable to compensate for amplitude changes.

Also, a track order filter combined with the above could be use to further extract information/parameters without the need for frequency analysis. A track order filter is a digital filter which is tuned for a particular frequency which can be changed by an algorithm. Normally this can be achieved without too much computational resources but allow an extraction of the signal amplitude at a particular frequency. So if the frequency has been calculated as described above in the time domain, then the filter can be tuned to obtain the amplitude of the signal at that frequency. By adjusting the bandwidth of the filter it should be possible to discriminate further parameters (like vibration, balance, etc.).

Figure 6C:
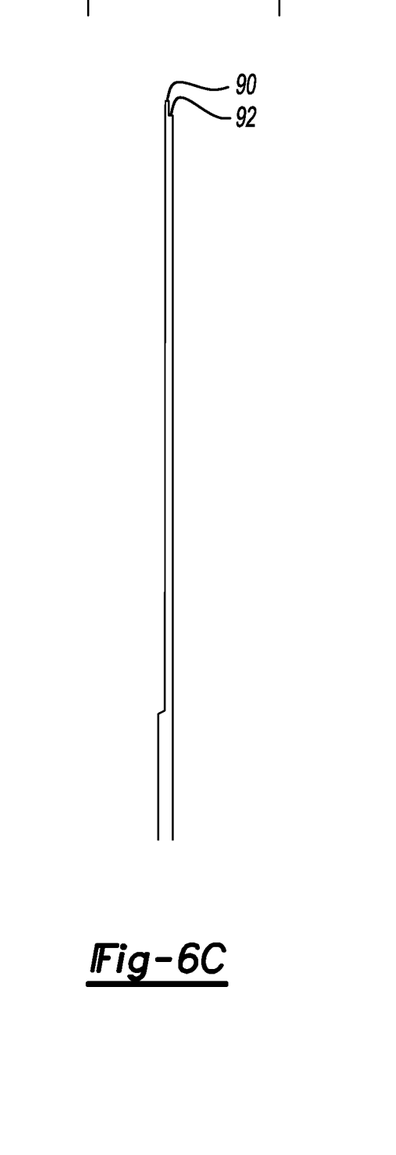

Unbalance in a propeller can also be identified by the appearance of the wave form in the frequency domain. In FIG. 6A, the point 88 is a single, relatively sharp point defined at the dominant peak of the graph. If the propeller is unbalanced, the wave form would display two relatively sharp points, close to one another, and having slightly different magnitudes. The two points correspond to different portions of the propeller and thus have the same frequency. However, the magnitude of the points would be different as a result of the imbalance. FIG. 6C shows the two points referenced at 90 and 92. The points are shown adjacent to one another for illustrative purposes (they would have the same frequency as thus overlap along the x-axis of a graph in the frequency domain). Thus, imbalance can be identified if the processor detects at least two different magnitudes having substantially the same frequency in the frequency domain.

It is noted that pressure waves can be positive and also negative, depending on the position of the blades and the direction of rotation. In addition, pressure waves can be positive or negative depending on the position of the sensor 62, whether the sensor 62 is upstream or downstream as well as the flight condition. For example, if the rotation direction in FIGS. 5A and 5B were opposite from the direction currently indicated, then the pressure waves would be negative. It is further noted that this would be the case when, for example, the pilot command to break when landing (i.e. reverse the pitch of the blades) so in the same engine depending of flight condition we will have both positive waves as well as negative waves. Embodiments of the invention can be practiced that are capable of determining fan parameters based on positive or negative pressure waves.

The exemplary embodiment could also be applied to give an indication of ice formation and thus define an embodiment of another invention. The formation of ice will affect the distance 82 or 76 shown in FIGS. 5A and 5B and will also therefore affect the signals illustrated in FIG. 4. The identification of ice formation is a desirable parameter for overall engine control. Anti-icing systems, such as those located on the moving frame of reference (the blades), can require some mechanism or feature to communicate the presence of ice from the moving frame of reference to the static frame of reference (the nacelle for example) where the electronics can be located. Applying the exemplary embodiment to determine ice formation could be useful individually or in combination with other ice detection systems to acquire information about ice formation and anti-icing system effectiveness.

While the invention has been described with reference to an exemplary embodiment, it will be understood by those skilled in the art that various changes may be made and equivalents may be substituted for elements thereof without departing from the scope of the invention. For example, the invention could be extended to even more blade sets and potentially apply to other domains like marine or wind turbines, or other operating environment for turbines. It is noted that the disclosure of measuring speed is the focus of the independent claims of this application; the disclosure of determining the pitch of blades, vibration of blades, and imbalance in the propeller are related but distinct inventions and may be the subject of divisional applications. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A method for determining operating, parameters of at least one rotating propeller driven by an engine, the method comprising the steps of:
    positioning a sensor upstream or downstream of the at least one rotating propeller;
    sensing pressure waves generated by one or more blades of the propeller using the sensor;
    determining the speed of the at least one rotating propeller through sensing by evaluating the sensed pressure waves generated by the blades of the propeller; and
    determining the pitch of the blades of the at least one rotating propeller through sensing by evaluating the sensed pressure waves generated by the blades of the propeller.

2. The method of claim 1 further comprising the step of:
changing the operation of the engine in real time in response to the results of at least one of the determining steps derived from the sensed pressure waves.

3. The method of claim 1 further comprising:
sensing the pressure dynamically in the time domain; and
converting the pressure data sensed in the time domain to the frequency domain with a fast Fourier transform.

4. The method of claim 3 further comprising:
associating the frequency having the highest magnitude in the frequency domain with the angular velocity of the propeller.

5. The method of claim 4 wherein said associating step further comprises the step of:
dividing the frequency having the highest magnitude in the frequency domain by the number of blades of the at least one propeller to determine the angular velocity of the propeller.

6. The method of claim 1 further comprising the steps of:
sensing the variation in ambient pressure dynamically with a the sensor; and
ascertaining a pitch of each blade from the sensed variation in ambient pressure over time.

7. The method of claim 6 wherein said ascertaining step further comprises the steps of:
directing a signal from the sensor to a processor wherein the signal corresponds to the sensed variation in ambient pressure over time; and
filtering substantially all noise from the signal.

8. The method of claim 6 wherein said ascertaining step further comprises the step of:
assessing at least one of an amplitude and a raise+decay time of a portion of the sensed variation in ambient pressure over time.

9. The method of claim 6 wherein said assessing step further comprises the step of:
comparing the sensed variation in ambient pressure over time with a predetermined wave form.

10. The method of claim 1 further comprising the steps of:
sensing the ambient pressure dynamically with a the sensor; and
identifying vibration in the blades of the at least one propeller through said sensing step.

11. The method of claim 10 wherein said identifying step further comprises the steps of:
converting the sensed variation in ambient pressure over time to the frequency domain with a fast Fourier transform; and
detecting a sequential series of frequencies in the converted ambient pressure data wherein the sequential series of frequencies has substantially the same magnitude in the frequency domain.

12. The method of claim 1 further comprising the steps of:
sensing the variation in ambient pressure dynamically with a the sensor; and
identifying unbalance in the at least one propeller through said sensing step.

13. The method of claim 12 wherein said identifying step further comprises the steps of:
converting the sensed variation in ambient pressure over time to the frequency domain with a fast Fourier transform; and
detecting at least two different magnitudes having substantially the same frequency in the frequency domain.

14. The method of claim 1 further comprising:
sensing the pressure dynamically in the time domain; and
converting the pressure data sensed in the time domain to the speed of at least one rotating propeller through a variable threshold comparator.

15. The method of claim 14 wherein said converting step includes the steps of:
applying a first threshold comparator over a predetermined time to identify a first number of pressure pulses having greater than a first predetermined magnitude; and
applying a second threshold comparator over the predetermined time to identify a second number of pressure pulses having greater than a second predetermined magnitude less than the first predetermined magnitude.

16. The method of claim 1 further comprising:
sensing the pressure dynamically in the time domain; and
detecting ice on the at least one propeller from the sensed pressure data.

17. The method of claim 1 wherein the sensor is positioned to sense pressure waves generated by the blades of the propeller external to the engine.

18. The method of claim 1 wherein the engine comprises a turbine engine housed in a nacelle;
wherein the blades of the propeller extend outwardly beyond the nacelle; and
wherein the sensor is positioned to sense pressure waves generated by the blades of the propeller external to the nacelle.

19. The method of claim 1 wherein the sensing step comprises sensing at least one of ambient pressure and pressure oscillations external to the engine.

20. The method of claim 1 wherein the sensing step comprises sensing the pressure waves generated by the blades of the propeller external to the engine.

21. The method of claim 20 wherein the at least one rotating propeller comprises an open rotor configuration of a turbine engine.

22. The method of claim 21 wherein the at least one rotating propeller comprises a first propeller rotating in a first direction and a second propeller rotating in a second direction opposite the first direction.

23. The method of claim 1 wherein the determining of the speed of the at least one rotating propeller comprises processing a signal from the sensor corresponding to the sensed pressure waves.

24. The method of claim 23 further comprising changing the operation of the engine in response to the processed signal from the sensor.

* * * * *